United States Patent
Jabbour et al.

(10) Patent No.: US 7,542,561 B1
(45) Date of Patent: Jun. 2, 2009

(54) METHOD AND SYSTEM FOR QUEUING CALLS BASED ON CALL TIME COMMITMENT

(75) Inventors: Fadi R. Jabbour, Sunnyvale, CA (US); Johnny H. Lee, Mountain View, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1021 days.

(21) Appl. No.: 10/775,416

(22) Filed: Feb. 10, 2004

(51) Int. Cl.
*H04M 3/00* (2006.01)

(52) U.S. Cl. .......................... 379/265.01; 379/265.02; 379/266.01

(58) Field of Classification Search ............ 379/266.03, 379/210, 309, 265.01, 265.02, 266.06; 705/418
See application file for complete search history.

(56) References Cited

U.S. PATENT DOCUMENTS

| | | | |
|---|---|---|---|
| 5,214,688 A * | 5/1993 | Szlam et al. ........... 379/266.08 |
| 5,454,033 A * | 9/1995 | Hahn et al. ................. 379/198 |
| 5,506,898 A | 4/1996 | Costantini et al. ........... 379/266 |
| 5,715,306 A | 2/1998 | Sunderman et al. ......... 379/265 |
| 5,721,770 A * | 2/1998 | Kohler .................. 379/265.12 |
| 5,742,675 A | 4/1998 | Kilander et al. ............. 379/265 |
| 5,943,415 A | 8/1999 | Tatebayashi ................ 379/265 |
| 6,546,097 B1 | 4/2003 | Peltz ..................... 379/265.07 |
| 6,560,329 B1 | 5/2003 | Draginich et al. ....... 379/265.02 |
| 6,665,537 B1 | 12/2003 | Lioy ......................... 455/435 |
| 6,724,877 B1 * | 4/2004 | Kucmerowski et al. 379/215.01 |
| 6,724,885 B1 * | 4/2004 | Deutsch et al. ........ 379/265.02 |
| 6,798,768 B1 * | 9/2004 | Gallick et al. ............... 370/352 |
| 7,248,677 B2 * | 7/2007 | Randall et al. ........... 379/93.23 |
| 2003/0108178 A1* | 6/2003 | Nguyen et al. ......... 379/220.01 |
| 2003/0169870 A1* | 9/2003 | Stanford ................ 379/265.12 |

* cited by examiner

*Primary Examiner*—Curtis Kuntz
*Assistant Examiner*—Amal Zenati
(74) *Attorney, Agent, or Firm*—Baker Botts L.L.P.

(57) ABSTRACT

A method for routing calls of an automatic call distributor system includes receiving a call from a caller requesting connection with an agent and providing the caller with an option to commit to a predetermined time limit for the call time. The method also includes assigning a higher priority to the call, in response to the caller committing to the predetermined time limit.

43 Claims, 3 Drawing Sheets

METHOD AND SYSTEM FOR QUEUING CALLS BASED ON CALL TIME COMMITMENT

TECHNICAL FIELD OF THE INVENTION

This invention relates generally to automated network communication distribution and more particularly, to a method and system for automatic call distribution based on a call time commitment.

BACKGROUND OF THE INVENTION

Automatic call distributors (ACDs) are specialized systems designed to match incoming requests for service, for example a telephone call or an e-mail, with a resource that is able to provide that service, for example a human contact center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Thus, when no agent is available to assist a caller, callers must wait in a queue until any of the agents finishes with its current caller. Consequently, a large number of callers that have very simple inquiries or requests may be forced to wait in the queue behind a small number of callers with time-intensive inquiries. This results in wasted time for the queued callers and consumes telecommunication resources on the ACD system.

SUMMARY OF THE INVENTION

The present invention provides a method and system for automatic call distribution by prioritizing callers based on a bounded call time commitment that substantially eliminates or reduces at least some of the disadvantages and problems associated with previous methods and systems for automatic call distribution.

In accordance with one embodiment of the present invention, a method for routing calls of an automatic call distributor system includes receiving a call from a caller requesting connection with an agent and providing the caller with an option to commit to a predetermined time limit for the call time. The method also includes assigning a higher priority to the call, in response to the caller committing to the predetermined time limit.

In accordance with another embodiment of the present invention, an automatic call distributing system for managing calls includes one or more interfaces operable to receive a call, including a request for service, from a user over a first connection with a first endpoint of the user. Also included in the system is a processor operable to provide the caller with an option to commit to a predetermined time limit for the call.

Important technical advantages of certain embodiments of the present invention include providing expedited service to particular callers. Other important technical advantages of certain embodiments of the present invention include more accurate estimates of wait times and improved efficiency in the allocation of call answering resources.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
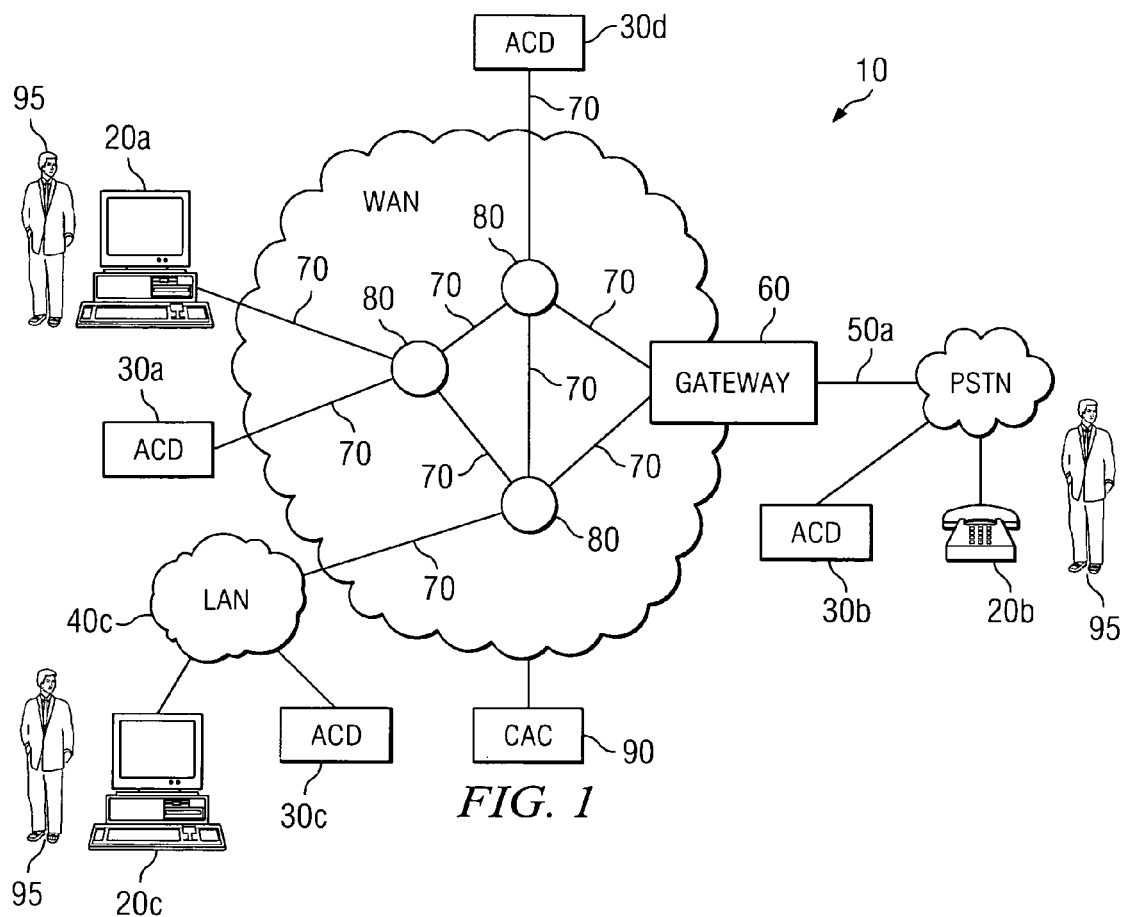
FIG. 1 is a block diagram illustrating a communication system including a plurality of endpoints operable to communicate among each other and a plurality of automatic call distributors (ACDs), in accordance with a particular embodiment of the present invention.

FIG. 1 illustrates a communication system 10 including a plurality of endpoints 20a-20d having the ability to establish communication sessions between each other and/or automatic call distributors (ACDs) 34a-34d, using one or more of communication networks 40a-40c. Automatic call distributors are specialized communication systems designed to route incoming calls to available agents, so that calls are properly and/or evenly distributed. For the purposes of this specification, "automatic call distributor" shall refer to any combination of hardware, software and/or embedded logic, which is operable to automatically distribute incoming calls. Furthermore, "calls" shall include requests for service transmitted using any audio and/or video means, including signals, data or messages transmitted through voice devices, text chat, web sessions, facsimile, instant messaging and e-mail, and a "caller 95" may represent a user of any endpoint 20a-20d initiating such a "call."

The teachings of the present invention provide a system and method for managing calls of an ACD that allows callers placing a call to a particular ACD 30 to commit to a bounded call time for the call in exchange for being placed in a preferred queue of calls. If the call exceeds the predetermined time limit, ACD 30 initiates a remedial action with respect to the call. Particular embodiments may implement any of several different remedial actions as described in greater detail below.

In the illustrated embodiment, communication network 40a is a wide area network (WAN) that enables communication between a plurality of endpoints 20a-20d and automatic call distributors 34a-34d distributed across multiple cities and geographic regions. In another embodiment, a single, central automatic call distributor may be used, which distributes incoming calls to agents distributed across multiple cities and geographic regions. Communication network 40b is a public switched telephone network (PSTN) and couples endpoint 20b and automatic call distributor 34c with communication network 40a through gateway 60. Communication network 40c is a local area network (LAN), which couples endpoints 20c and 20d and automatic call distributor 34d with communication network 40a. Accordingly, users of endpoints 20a-20d and automatic call distributors 34a-34d can establish communication sessions between and among each network component coupled for communication with one or more of networks 40a-40c. Communication links 50a and 50b couple communication networks 40a and 40b, and communication networks 40a and 40c, respectively. A call admission control (CAC) system 90 may be used to monitor the amount of bandwidth available over link 50b.

Communication network 40*a* includes a plurality of segments 70 and nodes 80 that couple endpoint 20*a* with automatic call distributors 34*a* and 34*b*, gateway 60, and communication networks 40*b*-40*c*. Therefore, a user of endpoint 20*a* is provided with access to endpoints 20*b*-20*d*, and automatic call distributors 34*a*-34*d*. Nodes 80 may include any combination of network components, gatekeepers, call managers, routers, hubs, switches, gateways, endpoints, or other hardware, software, or embedded logic implementing any number of communication protocols that allow for the exchange of packets in communication system 10.

Although the illustrated embodiment includes three communication networks 40*a*-40*c*, the term "communication network" should be interpreted as generally defining any network capable of transmitting audio and/or video telecommunication signals, data, and/or messages, including signals, data or messages transmitted through text chat, instant messaging and e-mail. Any one of networks 40*a*-40*c* may be implemented as a local area network (LAN), wide area network (WAN), global distributed network such as the Internet, Intranet, Extranet, or any other form of wireless or wireline communication network. Generally, network 40*a* provides for the communication of packets, cells, frames, or other portions of information (generally referred to as packets herein) between endpoints 20*a*-20*d*. Communication network 40*a* may include any number and combination of segments 70, nodes 80, endpoints 20*a*-20*d*, and/or automatic call distributors 34*a*-34*d*.

In a particular embodiment, communication network 40*a* employs voice communication protocols that allow for the addressing or identification of endpoints, nodes, and/or automatic call distributors coupled to communication network 40*a*. For example, using Internet protocol (IP), each of the components coupled together by communication network 40*a* in communication system 10 may be identified in information directed using IP addresses. In this manner, network 40*a* may support any form and/or combination of point-to-point, multicast, unicast, or other techniques for exchanging media packets among components in communication system 10. Any network components capable of exchanging audio, video, or other data using frames or packets, are included within the scope of the present invention.

Network 40*a* may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 40*a* may also be coupled to non-IP telecommunication networks through the use of interfaces or components, for example gateway 60. In the illustrated embodiment, communication network 40*a* is coupled with PSTN 40*b* through gateway 60. PSTN 40*b* includes switching stations, central offices, mobile telephone switching offices, pager switching offices, remote terminals, and other related telecommunications equipment that may be located throughout the world. IP networks transmit data (including voice and video data) by placing the data in packets and sending each packet individually to the selected destination, along one or more communication paths. Unlike a circuit-switched network (like PSTN 40*b*), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 20*d*, automatic call distributors 34*a*-34*b*, and gateway 60 are IP telephony devices. IP telephony devices have the ability to encapsulate a user's voice (or other input) into IP packets so that the voice can be transmitted over network 40*a*. IP telephony devices may include telephones, fax machines, computers running telephony software, nodes, gateways, or any other devices capable of performing telephony functions over an IP network.

It will be recognized by those of ordinary skill in the art that endpoints 20*a*-20*d*, automatic call distributors 34*a*-34*d*, and/or gateway 60 may be any combination of hardware, software, and/or encoded logic that provides communication services to a user. For example, endpoints 20*a*-20*d* may include a telephone, a computer running telephony software, a video monitor, a camera, an IP phone, a cell phone or any other communication hardware, software, and/or encoded logic that supports the communication of packets of media (or frames) using communication network 40*a*. Endpoints 20*a*-20*d* may also include unattended or automated systems, gateways, other intermediate components, or other devices that can establish media sessions. Although FIG. 1 illustrates a particular number and configuration of endpoints, automatic call distributors, segments, nodes, and gateways, communication system 10 contemplates any number or arrangement of such components for communicating media.

Figure 2:
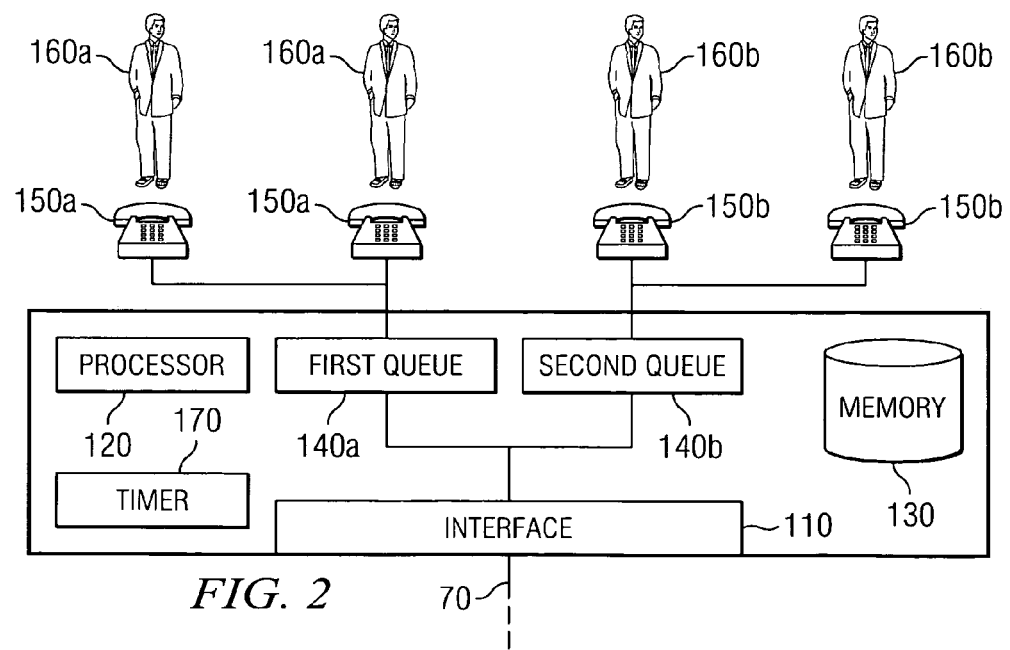
FIG. 2 is a block diagram illustrating an ACD of FIG. 1 in more detail, including aspects of the present invention.

FIG. 2 illustrates ACD 30 in more detail, in accordance with a particular embodiment of the present invention. ACD 30 includes an interface 110, a processor 120, a first queue 140*a*, a second queue 140*b*, and a memory 130. When ACD 30 receives a call on interface 110, if an agent 160 is unavailable to answer the call, processor 120 may store the call in queues 160. In queuing the call, processor 120 may assign a priority to the call based in part on whether the caller agrees to a time limit for the call. The order in which calls will be answered from first queue 140*a* and second queue 140*b* is based at least in part, on the priority assigned to each call.

Interface 110 couples ACD 30 with communication network 40*a*, using segment 70. In a particular embodiment, processor 120 provides, in whole or in part, the functionality of interface 110, and interface 110 and processor 120 represent the same component. In general, interface 110 may represent any appropriate combination of hardware and/or software suitable to implement the functionality described herein.

First queue 140*a* and second queue 140*b* store calls received by ACD 30 until an appropriate agent 160 is available to answer the calls. Processor 120 may assign a priority to a particular call by storing the call in a particular queue 140. First queue 140*a* and second queue 140*b* store calls by storing information identifying a port of ACD 30 through which the call is connected, storing information identifying a network address at which caller 95 can be contacted, or otherwise storing information sufficient to allow an agent 160 to interact with caller 95 when the call advances to the front of that particular queue 140. First queue 140*a* and second queue 140*b* may represent portions of memory 130, distinctly separate memory elements, or any other components suitable for storing calls received by ACD 30. Although FIG. 2 shows an ACD 30 that includes a first queue 140*a* and second queue 140*b*, ACD 30 may be configured to include any suitable number of queues 140.

In a particular embodiment, first queue 140*a* and second queue 140*b* represent first-in-first-out (FIFO) queues with the oldest call in that particular queue being connected to the next available agent. More specifically, queues 140 include a back end and a front end. ACD places a call at the back end of, for example, first queue 140 and, as previous calls are removed from first queue 140, the call advances to the front end of first queue 140. Once the call reaches the front end, the call will be connected to the next available agent 160*a* taking calls from first queue 140*a*.

Additionally, first queue 140*a* and second queue 140*b* may each be associated with a particular subset of agents 160. The particular subset of agents 160 assigned to first queue 140*a* or second queue 140*b* may respond only to calls stored to the particular queue 140 assigned to that subset. Alternatively, all agents 160 may be capable of accepting calls from either queue 140. In general, agents 160 may be assigned to queues 140 in any appropriate manner, depending on the configuration of ACD 30. For the purposes of this example, it is assumed that agents 160*a* accept calls from first queue 140*a*, while agents 160*b* accept calls from second queue 140*b*.

Processor 120 routes calls received by ACD 30, generates prompts for and processes responses from caller 95, and provides other computational functionality that may be used by ACD 30. Processor 120 may be a general-purpose computer, dedicated microprocessor, or any other suitable processing device. Examples of processor 120 include application-specific integrated circuits (ASICs), field-programmable gate arrays (FPGAs), digital signal processors (DSPs) and any other suitable specific or general-purpose processors.

Memory 130 stores software, configuration data, caller profiles, and any other appropriate information to be used in operation of ACD 30. Memory 130 may also include components of queue 140. Memory 130 may comprise any collection and arrangement of volatile or non-volatile, local or remote devices suitable for storing data, such as for example computer readable medium random access memory (RAM) devices, read only memory (ROM) devices, magnetic storage devices, optical storage devices, or any other suitable data storage devices.

Timer 170 tracks a call time associated with a call received by ACD 30. As used herein, the "call time" may represent any appropriate measure of time associated with the call. As one example, the call time may represent the span of time between when caller 95 is connected to an agent 160 and the end of the call. As another example, if caller 95 must navigate through multiple agents before connecting with a specialized agent appropriate for handling the call, the call time may represent the span of time between caller 95 finally being connected to the specialized agent and the end of the call. As yet another example, if caller 95 is frequently placed on hold by agent 160*a* during the course of the call, the call time may represent only the span of time when caller 95 is able to interact with agent 160*a*. Timer 170 may represent any suitable combination of hardware, software and/or embedded logic capable of providing the described functionality. Examples of timer 170 include, but are not limited to, a software process operating on processor 120, a wristwatch operated by agent 160*a*, and a digital timer mounted on endpoint 20. In the illustrated embodiment, timer 170 represents a combination of software and hardware located within ACD 30 and capable of concurrently timing call times associated with all calls being handled by ACD 30.

In operation, when ACD 30 receives a call, processor 120 determines whether any of agents 160 are currently available. If so, the call may be directed immediately to the available agent 160. In such a situation, the call may be routed directly to a particular agent 160 without ever being routed through either of first queue 140*a* or second queue 140*b*. Depending on the configuration of ACD 30, caller 90 may or may not be prompted to commit to a predetermined time limit if an agent 160 is available immediately.

If, however, no agent 160 is available to assist caller 95, processor 120 prompts caller 95 to choose between first queue 140*a* and second queue 140*b* based on whether caller 95 is willing to commit to a predetermined limit for the call time. Depending on the characteristics of endpoint 20, processor 120 may prompt caller 95 by playing a voice recording, sending an instant message, transmitting an SMS text message and/or communicating with endpoint 20 in any other manner. Processor 120 may also provide additional information to assist caller 95 in making the choice. For example, processor 120 may indicate how many other callers 95 are already in each queue 140 or may estimate a wait time for each queue 140. The time limit presented to caller 95 may apply to any appropriate measure of the call time, as described above.

Caller 95 then selects between first queue 140*a* and second queue 140*b* by either agreeing or refusing to commit to the time limit. Depending on the characteristics of the particular endpoint 20 being used, caller 95 may dial a specified digit, press a keyboard key, verbally agree to the constraint, or otherwise indicate the option caller 95 has chosen.

Although either queue 140 may be configured to receive calls associated with a particular response of user 95, for the purposes of illustration, it is assumed that processor 120 places the call in first queue 140*a* if caller 95 agrees to the time limit. If caller 95 refuses to commit to the time limit, then, based on this assumption, processor 120 places the call at a back end of second queue 140*b*. When the call advances to the front end of second queue 140*b*, processor 120 connects the call to the next available agent 160*b*. This connection may comprise, for example, coupling caller 95 with the suitable agent if the call comprises a voice call. Once connected, caller 95 may interact with agent 160*b* as desired, and no time limits are placed on the call.

If, instead, caller 95 agrees to the time limit, processor 120 stores the call at the back end of first queue 140*a*. When the call advances to the front end of first queue 140*a*, processor 120 connects the call to the next available agent 160*a* and caller 95 may then interact with agent 160*a*. As noted above, this connection may comprise, for example, coupling caller 95 with the suitable agent if the call comprises a voice call.

Because caller 95 agreed to the time limit, the call time has a predetermined maximum limit. Specifically, when ACD connects caller 95 to agent 160*a*, agent 160*a* or processor 120 starts timer 170. Depending on the characteristics and configuration of timer 170 and ACD 30, this may represent agent 40*a* checking a start time for the call on a clock or watch that represents timer 170, processor 120 beginning a software process representing timer 170, or any other action that causes timer 170 to begin timing the call time. Processor 120 and/or agent 160*a* monitors timer 170 until caller 95 terminates the call.

If processor determines that the call time has met or exceeded the time limit, processor 120 initiates a remedial action. This remedial action may represent any suitable action taken by ACD 30 to disconnect or reassign the call. Furthermore, the remedial action may include actions taken by agent 160*a* and/or actions initiated by processor 120 or other components of ACD 30.

As one example, the remedial action may include disconnecting the call. In this case, ACD 30 or agent 160*a* may hang up on caller 95 once the time limit has been reached. If caller 95 wishes to continue the conversation or receive more assistance from an agent 160*a*, caller 95 will then call ACD 30 back and begin the call again.

As another example, the remedial action may include placing the call in the back end of an appropriate queue 140. Depending on the configuration of ACD 30, this may include returning the call to the back end of first queue 140*a* or placing the call at the back end of second queue 140b. Thus, once the call time exceeds the time limit, agent 160a or processor 120 places the call at the back end of the appropriate queue 140. If caller 95 wishes to continue the call, caller 95 then waits until the call once again advances to the front of the respective queue 140. At that point, caller 95 will be connected to another agent 160 and caller 95 will be able to complete the call. Depending on the configuration of ACD 30, the call time may be reset and caller 95 may still be constrained by the time limit, or caller may now have an unlimited amount of time with which to interact with agent 160.

ACD 30 may additionally provide warnings to caller 95 and/or agent 160a before the call time reaches the time limit. For example, ACD 30 may provide a warning indication to caller 95 a predetermined amount of time before the call time reaches the time limit. The warning indication may be an audio tone that is transmitted to caller 95, a recorded message that is played to caller 95, a popup window that is displayed on endpoint 20, or any other suitable form of indication that informs caller 95 that the call time has nearly reached the time limit.

Furthermore, particular embodiments of ACD 30 may allow agent 160a to extend the time limit if agent 160a chooses. Agent 160a may choose to extend the time limit based on how close the call is to completion, the number of calls waiting in queues 140, or any other appropriate considerations. To extend the call, agent 160a indicates to ACD 30, such as by pressing a button at endpoint 20, that the call should be extended. If agent 160a indicates the time limit should be extended, a predetermined extension time is added to the time limit and no remedial action is taken when the call time reaches the time limit.

If agent 160a chooses to extend the call, the call continues uninterrupted beyond the time limit. If the call continues through the end of the extension time, agent 160a or ACD 30 may then initiate the remedial action. In a particular embodiment, ACD 30 may provide a warning to caller 95 a predetermined amount of time before the extension time expires. Agent 160a may or may not have the opportunity to extend the call again at the end of the extension time, depending on the configuration of ACD 30.

Thus, particular embodiments of ACD 30 provide a variety of benefits. By offering caller 95 access to an express queue in return for committing to a limited call time, ACD 30 can reduce wait times for callers 95. Additionally, particular embodiments of ACD 30 may allow agent 160a to exercise discretion in choosing to extend the limit for the call time of a particular call, providing more efficient use of ACD resources. Furthermore, particular embodiments of ACD 30 may provide a warning indication to caller 95 and/or agent 160 before the time limit expires to allow the caller to conclude the call before the remedial action is initiated, also allowing for more efficient use of ACD resources.

Figure 3A:
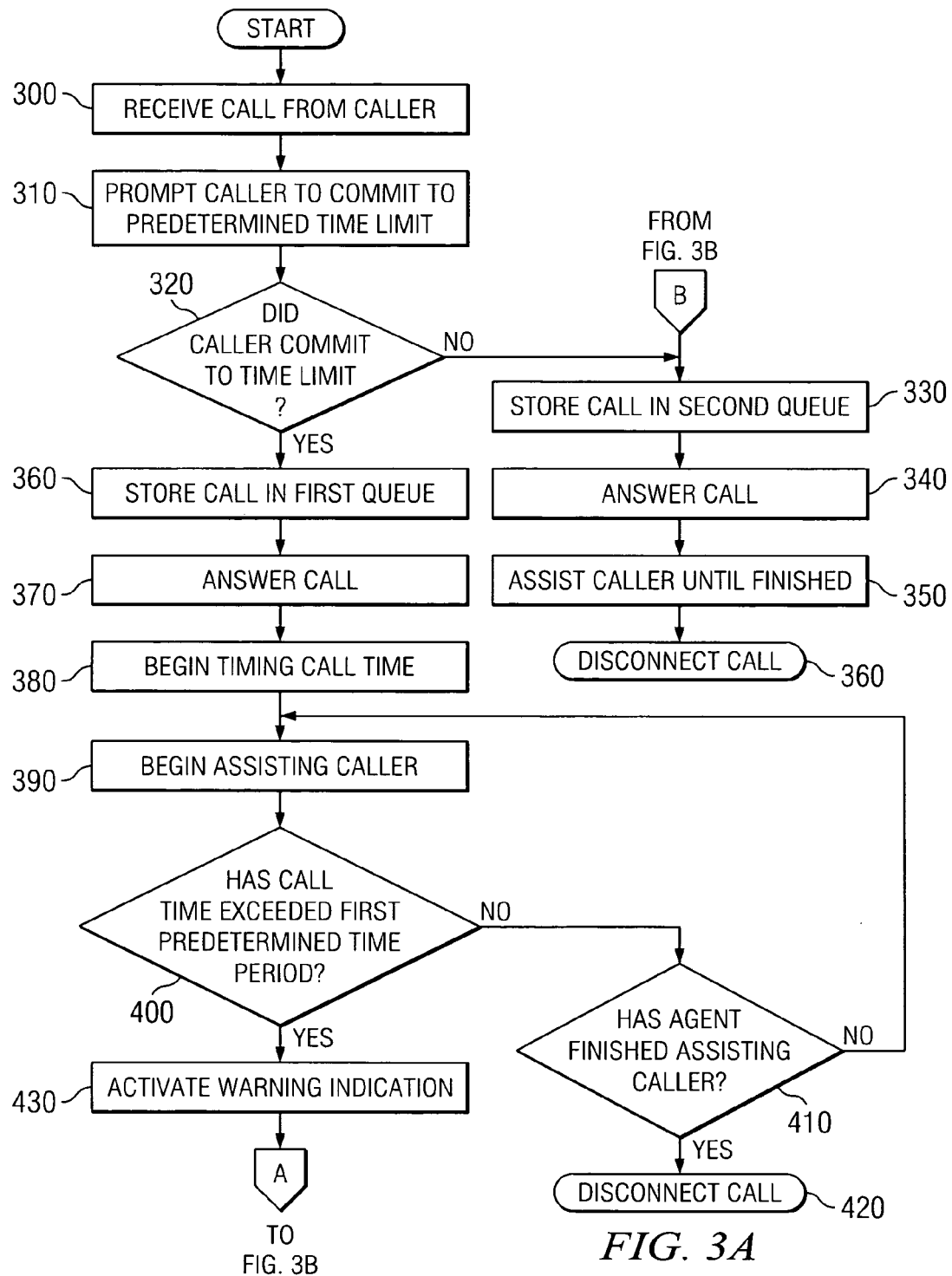
FIG. 3 is a flow chart illustrating a method for automatic call distribution, in accordance with another embodiment of the present invention.
Figure 3B:
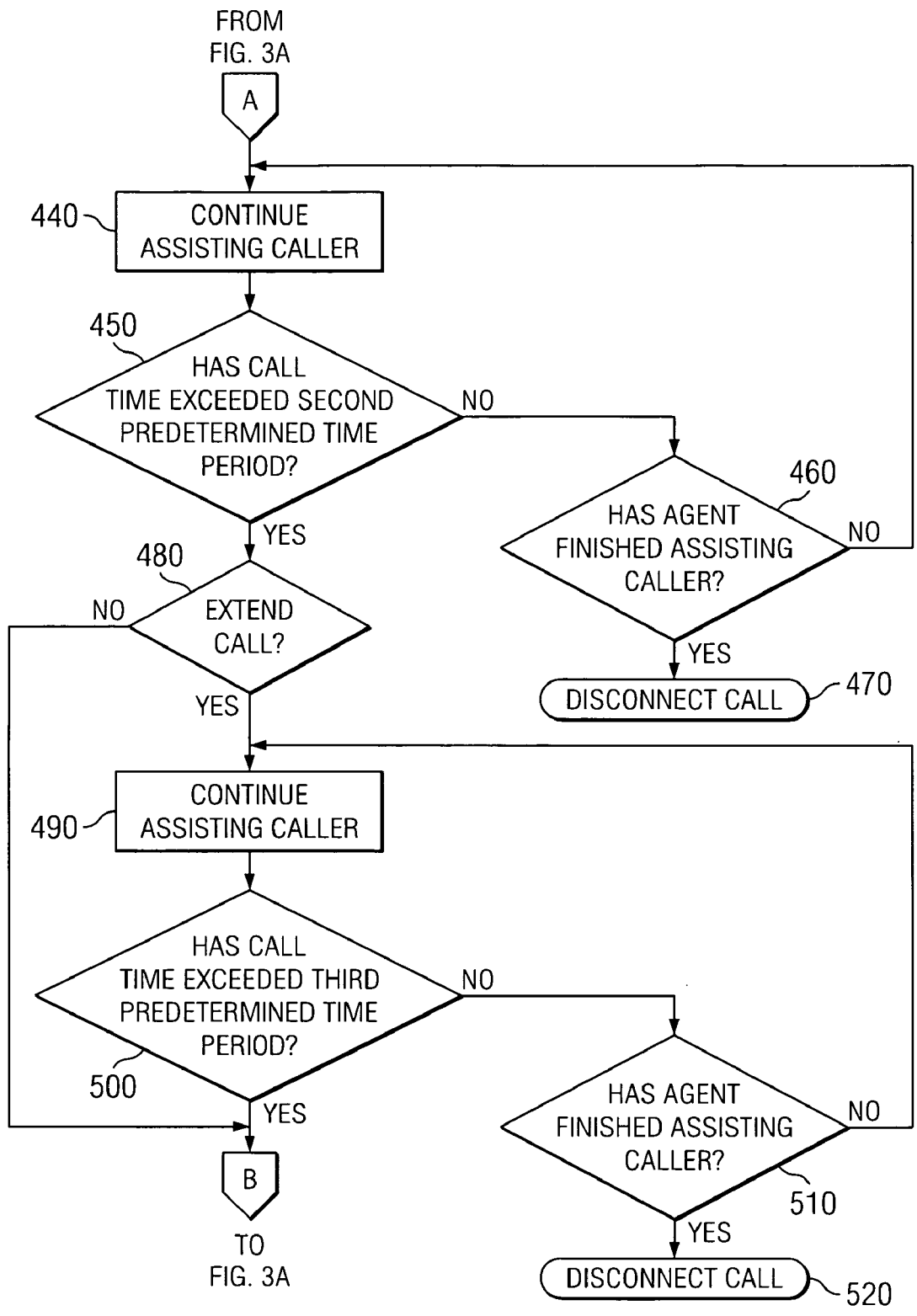

FIG. 3 is a flow chart illustrating a method for routing calls of an automatic call distributor system in accordance with a particular embodiment of the present invention. In the illustrated embodiment, ACD 30 places calls from callers who commit to the time limit in first queue 140a, which is answered by agents 160a. ACD 30 places calls from callers who choose not to commit to the time limit in second queue 140b, which is answered by agents 160b. Additionally, in this example, ACD 30 is configured to provide a warning indication to caller 95 if the call time exceeds a first predetermined time period and to allow agents 160 to decide whether to extend the call if the call time exceeds a second predetermined period of time. Furthermore, for the purposes of this example, the remedial action consists of ACD returning the call to back end of second queue 140b.

The method begins at step 300 where ACD receives a call from caller 95. The call may comprise a request for service from a suitable agent and may be received at interface 110 of ACD 30. The connection may be made with an endpoint of caller 95, such as an analog telephone, IP phone, cell phone or PC.

At step 310, ACD prompts caller 95 to commit to a predetermined time limit for a call time associated with the call. ACD 30 determines whether caller 95 has chosen to commit to the predetermined time limit at step 320. If the caller chooses not to commit to the predetermined time limit, ACD stores the call at the back end of second queue 140b at step 330. As agents 160b answer calls stored in second queue 140b, the call advances to the front end of second queue 140b. Once the call reaches the front end of second queue 140b, the next available agent 160b answers call at step 340. At step 350, agent 160b assists caller 95 until agent 160b finishes assisting caller 95. Agent 160b then disconnects the call at step 360, thereby ending the process.

If instead caller 95 commits to the predetermined time limit, ACD 30 stores the call at the back end of first queue 140a at step 360. As calls stored in first queue 140a are answered, the call advances toward the front end of first queue 140a. Once the call reaches the front end of first queue 140a, the next available agent 160a answers the call at step 370. Additionally, agent 160a begins timing the call at step 380. Agent 160a then begins assisting the caller at step 390.

At step 400, agent 160a determines whether the call time has exceeded the first predetermined time period. If not, agent 160a determines whether agent 160a has finished assisting caller 95 at step 410. If agent 160a has finished assisting caller 95, agent 160a disconnects the call at step 420, ending the process. If agent 160a has not finished assisting caller 95, agent 160a continues assisting caller 95, returning to step 390.

Continuing with step 420, if agent 160a determines, that the call time has exceeded the first predetermined time period, agent 160a activates the warning indication at step 430. Agent 160a continues assisting caller 95 at step 440. At step 450 agent 160a determines whether the call time has exceeded the second predetermined period of time. If not, agent 160a determines whether agent 160a has finished assisting caller 95 at step 460. If agent 160a has finished assisting caller 95, agent 160a disconnects the call at step 470, ending the process. If agent 160a has not finished assisting caller 95, agent 160a continues assisting caller 95, returning to step 440.

Continuing with step 460, if agent 160a determines that the call time has exceeded the second predetermined time period, agent 160a decides whether to extend the call at step 480. If agent 160a decides not to extend the call, agent 160a stores the call in second queue 140b at step 330.

If agent 160 decides to extend the call, agent continues assisting caller 95 at step 490. At step 500 agent 160a determines whether the call time has exceeded the third predetermined period of time. If not, agent 160a determines whether agent 160a has finished assisting caller 95 at step 510. If agent 160a has finished assisting caller 95, agent 160a disconnects the call at step 520, ending the process. If agent 160a has not finished assisting caller 95, agent 160a continues assisting caller 95, returning to step 490. If instead agent 160a determines the call time has exceeded the third predetermined period of time, agent 160a stores the call in second queue 140b at step 330.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for routing calls of an automatic call distributor system, comprising:
   receiving a call from a caller requesting connection with one of a plurality of agents;
   providing the caller with an option to commit to a predetermined time limit for the call time; and
   assigning a higher priority to the call if the caller commits to the predetermined time limit.

2. The method of claim 1 wherein assigning the call a higher priority comprises:
   queuing the call in a queue, in response to the caller committing to the predetermined time limit;
   queuing the call in a second queue, in response to the caller choosing not to commit to the predetermined time limit.

3. The method of claim 1, further comprising:
   connecting the call to one of the agents;
   determining that a call time associated with the call has exceeded a predetermined time limit; and
   initiating a remedial action, in response to determining that the call time has exceeded the predetermined time limit.

4. The method of claim 3, wherein initiating the remedial action comprises disconnecting the call.

5. The method of claim 3, wherein initiating the remedial action comprises re-queuing the call in the first queue.

6. The method of claim 3, wherein initiating the remedial action comprises:
   deciding whether to extend the predetermined time limit;
   determining that the time associated with the call has exceeded a second predetermined time limit; and
   initiating a second remedial action in response to determining that the time associated with the call has exceeded the second predetermined time limit.

7. The method of claim 6, wherein initiating the second remedial action comprises disconnecting the call.

8. The method of claim 6, wherein initiating the second remedial action comprises re-queuing the call in the first queue.

9. The method of claim 6, further comprising initiating a third remedial action in response to deciding not to extend the predetermined time limit.

10. The method of claim 3, wherein connecting the call to one of the agents further comprises connecting the call to one of the agents and starting a timer in response to connecting the call, and wherein determining that the time associated with the call has exceeded the predetermined time limit comprises determining that the time associated with the call has exceeded the predetermined time limit based on the timer.

11. The method of claim 3, wherein determining that the time associated with the call has exceeded the predetermined time limit comprises:
   determining that the time associated with the call has exceeded a first predetermined time limit;
   activating a warning indication in response to determining that the time has exceeded the first predetermined time limit; and
   determining that the time associated with the call has exceeded a second predetermined time limit.

12. The method of claim 11, wherein indicating to the caller comprises generating an audio tone.

13. The method of claim 11, wherein indicating to the caller comprises playing a recorded message to the caller.

14. The method of claim 1, wherein providing the caller with the option comprises:
   providing the caller with an estimated wait time based at least on the predetermined time limit; and
   providing the caller with the option to commit to the predetermined time limit for the call time.

15. An automatic call distributing system for managing calls of an automatic call distributor, comprising:
   at least one interface operable to receive a call from a caller over a first connection with a first endpoint of the caller, the call comprising a request for service;
   a processor operable to:
      provide the caller with an option to commit to a predetermined time limit for a call time; and
      assign a higher priority to the caller if the caller commits to the predetermined time limit.

16. The system of claim 15 further comprising:
   a first queue operable to retain the call until an agent for the first queue becomes available; and
   a second queue operable to retain the call until an agent for the second queue becomes available; and
   wherein the processor is operable to assign a higher priority to the caller by queuing the call in the first queue in response to the caller committing to the predetermined time limit.

17. The system of claim 16, wherein the processor is further operable to:
   queue the call in the first queue, in response to the caller selecting the first queue;
   connect the call to an agent when an agent becomes available for the first queue;
   determine that a time associated with the call has exceeded a predetermined time limit; and
   initiate a remedial action, in response to determining that the time associated with the call has exceeded the predetermined time limit.

18. The system of claim 17 wherein the processor is operable to initiate the remedial action by disconnecting the call.

19. The system of claim 17, wherein the processor is operable to initiate the remedial action by re-queuing the call in the first queue.

20. The system of claim 17, wherein the processor is operable to initiate the remedial action by:
   deciding whether to extend the predetermined time limit;
   determining that the time associated with the call has exceeded a second predetermined time limit; and
   initiating a second remedial action in response to determining that the time associated with the call has exceeded the second predetermined time limit.

21. The system of claim 20, wherein the processor is operable to initiate the second remedial action by disconnecting the call.

22. The system of claim 20, wherein the processor is operable to initiate the second remedial action by re-queuing the call in the first queue.

23. The system of claim 20, further comprising initiating a third remedial action in response to deciding not to extend the predetermined time limit.

24. The system of claim 17, wherein the processor is further operable to start a timer in response to connecting the call to one of the agents, and wherein the processor is further operable to determine that the time associated with the call has exceeded the predetermined time limit based on the timer.

25. The system of claim 17, wherein the processor is further operable to determine that the time associated with the call has exceeded the predetermined time limit by:

determining that the time associated with the call has exceeded a first predetermined time limit;

activating a warning indication in response to determining that the time has exceeded the first predetermined time limit; and determining that the time associated with the call has exceeded a second predetermined time limit.

26. The system of claim 25, wherein the processor is operable to activate a warning indication by generating an audio tone.

27. The system of claim 25, wherein the processor is operable to activate a warning indication by playing a recorded message to the caller.

28. The system of claim 15, wherein the processor is operable to provide the caller with the option by:

providing the caller with an estimated wait time based at least on the predetermined time limit; and providing the caller with the option to commit to the predetermined time limit for the call time.

29. A computer program stored on a computer readable medium, the computer program operable to:

receive a call from a caller requesting connection with one of a plurality of agents;

provide the caller with an option to commit to a predetermined time limit for the call time; and assign a higher priority to the call if the caller commits to the predetermined time limit.

30. The computer program of claim 29, wherein the computer is further operable to assign the higher priority to the call by:

queuing the call in a first queue, in response to the caller committing to the predetermined time limit;

queuing the call in a second queue, in response to the caller choosing not to commit to the predetermined time limit.

31. The computer program of claim 29, wherein the computer program is further operable to:

queue the call in the first queue, in response to the caller committing to the predetermined time limit;

connect the call to one of the agents;

determine that a call time associated with the call has exceeded a predetermined time limit; and initiate a remedial action, in response to determining that the call time has exceeded the predetermined time limit.

32. The computer program of claim 31, wherein the computer program is operable to initiate the remedial action by disconnecting the call.

33. The computer program of claim 31, wherein the computer program is operable to initiate the remedial action by re-queuing the call in the first queue.

34. The computer program of claim 31, wherein the computer program is operable to initiate the remedial action by:

deciding whether to extend the predetermined time limit;

determining that the time associated with the call has exceeded a second predetermined time limit; and initiating a second remedial action in response to determining that the time associated with the call has exceeded the second predetermined time limit.

35. The computer program of claim 34, wherein the computer program is operable to initiate the second remedial action by disconnecting the call.

36. The computer program of claim 34, wherein the computer program is operable to initiate the second remedial action by re-queuing the call in the first queue.

37. The computer program of claim 34, wherein the computer program is further operable to initiate a third remedial action in response to deciding not to extend the predetermined time limit.

38. The computer program of claim 34, wherein the computer program is further operable to start a timer in response to connecting the call to one of the agents, and wherein the computer program is further operable to determine that the time associated with the call has exceeded the predetermined time limit based on the timer.

39. The computer program of claim 38, wherein the computer program is operable to determine that the time associated with the call has exceeded the predetermined time limit by:

determining that the time associated with the call has exceeded a first predetermined time limit;

activating a warning indication in response to determining that the time has exceeded the first predetermined time limit; and determining that the time associated with the call has exceeded a second predetermined time limit.

40. The computer program of claim 39, wherein the computer program is operable to activate the warning indication by generating an audio tone.

41. The computer program of claim 39, wherein the computer program is operable to activate the warning indication by playing a recorded message to the caller.

42. The computer program of claim 39, wherein the computer program is operable to provide the caller with the option by:

providing the caller with an estimated wait time based at least on the predetermined time limit; and providing the caller with the option to commit to the predetermined time limit for the call time.

43. A system for routing calls of an automatic call distributor system, comprising:

means for receiving a call from a caller requesting connection with one of a plurality of agents;

means for providing the caller with an option to commit to a predetermined time limit for the call time; and means for assigning a higher priority to the call if the caller commits to the predetermined time limit.

* * * * *